(12) United States Patent
Morgan et al.

(10) Patent No.: US 7,416,150 B2
(45) Date of Patent: Aug. 26, 2008

(54) OVERMOLDED INERTIA SENSOR MASS FOR A SEAT BELT RETRACTOR

(75) Inventors: Christopher D. Morgan, Sterling Heights, MI (US); Huiyao Liu, Rochester, MI (US); Stephan F. Vetter, St. Clair Township, MI (US); Kristopher Shaffer, Chesterfield Township, MI (US); David R. Arnold, Macomb, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/974,448

(22) Filed: Oct. 15, 2007

(65) Prior Publication Data
US 2008/0029635 A1 Feb. 7, 2008

Related U.S. Application Data

(62) Division of application No. 11/058,936, filed on Feb. 16, 2005, now Pat. No. 7,300,013.

(51) Int. Cl.
*B60R 22/40* (2006.01)
(52) U.S. Cl. .......... 242/384.6; 242/384.4; 280/806; 297/478; 297/480; 73/514.01; 73/514.37
(58) Field of Classification Search .......... 242/384, 242/384.1, 384.2, 384.4, 384.5; 73/493, 73/510, 514.01, 514.21, 514.22, 514.37; 297/478, 480; 280/806
See application file for complete search history.

(56) References Cited

U.S. PATENT DOCUMENTS

| | | | | |
|---|---|---|---|---|
| 1,933,909 A | * | 11/1933 | Huddle | 403/129 |
| 3,539,234 A | * | 11/1970 | Rapata | 384/203 |
| 4,357,651 A | * | 11/1982 | Mayer | 362/275 |
| 5,860,728 A | * | 1/1999 | Maglica | 362/191 |
| 6,230,997 B1 | * | 5/2001 | Palliser | 242/384.4 |
| 6,443,382 B1 | * | 9/2002 | Bae | 242/382.6 |

* cited by examiner

*Primary Examiner*—Peter M. Cuomo
*Assistant Examiner*—Stefan Kruer
(74) *Attorney, Agent, or Firm*—Lonnie Drayer

(57) ABSTRACT

A seat belt retractor (10) has an actuator (14) for unlocking and locking the seat belt retractor (10) An inertial sensor (18) detects changes in vehicle acceleration and interacts with the actuator (14) to lock and unlock the seat belt retractor (10). The inertial sensor (18) has one inertial sensor mass, each mass (26, 27, 29, 30, 32, 33) has a wide portion (70) and a narrow portion (72). Preferably each inertial sensor mass (26, 27, 29, 30, 32, 33) has a high density body (31) embedded in the wide portion (70) of the elastomeric material (34). The inertial sensor mass (26, 27, 29, 36, 32, 33) has a greater density than the elastomeric material (34) Moreover, the elastomeric material (34) at least partially surrounds an exterior circumferential surface (38) of the inertial sensor mass (26, 27, 29, 30, 32, 33). The inertial sensor mass (26, 27, 29, 30, 32, 33) has a body (31) having the wide portion (70) and optionally the narrow portion (72) with preferably one or more elastomeric protruding member (54, 58) extending from said body (31). The one or more protruding members (55, 58) are movable relative to said body (31) and soften contact rattle impacts thus reducing noise.

6 Claims, 9 Drawing Sheets

OVERMOLDED INERTIA SENSOR MASS FOR A SEAT BELT RETRACTOR

This is a divisional of application Ser. No. 11/058,936 file Feb. 16, 2005 now U.S. Pat. No. 7,300,013.

FIELD OF THE INVENTION

This invention relates to a seat belt retractor.

BACKGROUND OF THE INVENTION

A seat belt assembly for a motor vehicle typically has a seat belt retractor that retracts belt webbing onto a spool in a housing. When the belt webbing is drawn or protracted from this housing, the spool winds a retraction spring, which later causes the spool to rotate in an opposite direction to retract the unused portion of the belt webbing back onto the spool.

In a crash, the seat belt retractor has a lock that prevents the belt webbing from extending further from the housing. The lock may be actuated by an inertial sensor, which responds to changes in vehicle acceleration that occur during the crash. When a large change in vehicle acceleration is detected, the inertial sensor triggers the lock of the seat belt retractor to lock the spool against movement and thereby secure the belt webbing in place during the crash.

The inertial sensor has a dense inertial sensor mass that moves in a sensor housing to respond to changes in acceleration. This inertial sensor mass is typically made of metal because of its high density. In this way, the inertial sensor mass may be kept small and still retain its sensitivity. However, during normal vehicle operation, the free movement of the metal mass within the sensor housing causes rattling that may be unpleasant to hear. A need therefore exists for a seat belt retractor that reduces the undesirable noise associated with movement of the inertial sensor mass.

A prior art inertial mass sensor 154 employing a metal outer mass 160 with an elastomeric center 162, conical upper top 194 and flat bottom 190 is described in U.S. Pat. No. 6,164,581 entitled "Low Noise Self Compensating Vehicle Sensor and Retractor". This prior art sensor 154 as shown in FIG. 10 provided some noise reduction at the upper and lower contact points. A primary drawback of this prior art sensor was the tilt sensitivity was diminished due to an increase in friction drag on the actuator lever 140. Additionally, vibrational frequencies of the vehicle were still being transmitted through other contact points on the sensor surface and the housing 150 resulting in a pronounced noise signature. Accordingly a new approach to sound deadening is needed that can be accomplished without degrading the sensitivity of the inertial mass sensors to changes in acceleration.

SUMMARY OF THE INVENTION

Like existing seat belt retractor assemblies, a seat belt retractor according to the present invention has an inertial sensor that detects changes in vehicle acceleration. The inertial sensor comprises an inertial sensor mass and a housing that receives the inertial sensor mass. The inertial sensor mass is moveable within the housing to respond to changes in vehicle acceleration. This sensor triggers actuation of a lock of the seat belt retractor. In contrast to conventional designs, the heavy metal inertial sensor mass is at least partially embedded in an elastomeric material. In this way, vibration noise is damped by this material without reducing sensitivity.

The inertial sensor mass has an exterior surface that at one point contacts the actuator and at another point contacts the sensor housing. An elastomeric material substantially surrounds the inertial sensor mass around the points of supporting contact and at the actuator point of vertical or zero acceleration contact there is no elastomeric material. Indeed, the elastomeric material may support the entire inertial sensor mass on the sensor housing. In addition, the elastomeric material may have metallic materials embedded therein to add weight to the inertial sensor mass. The inertial sensor mass may have a wide portion suspended over a narrow portion to have a center of gravity that responds quickly to changes in vehicle acceleration.

The present invention further encompasses a method of manufacturing the inventive inertial sensor mass. The body of an inertial sensor mass is placed in a cavity of a mold. The cavity is sized larger than the body of an inertial sensor mass. An elastomeric polymer is injected into the cavity of the mold and forms around the inertial sensor mass. The inertial sensor mass is removed from the cavity, placed in a sensor housing, and then linked to a lock of a seat belt retractor.

The body of an inertial sensor mass may be suspended in the cavity during the molding process. A support, such as a pin, may hold the inertial sensor mass in place while the polymer is injected into the cavity. If the body of the inertial sensor mass is made of a ferromagnetic material. The support may be magnetized to further secure the body of the inertial sensor mass in place during this process. The polymer may be injected into the cavity of the mold from opposite sides of the inertial sensor mass so that fluid forces from the injection may neutralize each other.

This technique produces an inertial sensor mass having good noise reduction characteristics while still having good sensitivity. In addition, using an elastomeric material on the exterior of the inertial sensor mass allows the sensor to have a greater variety of shapes. In fact, a simple inexpensive inertial sensor mass, such as a sphere, may be simply molded with the elastomeric material around the inertial sensor mass to form any number of different shapes.

BRIEF DESCRIPTION OF THE DRAWINGS

The invention will be described by way of example and with reference to the accompanying drawings in which.

DETAILED DESCRIPTION OF THE INVENTION

Figure 1:
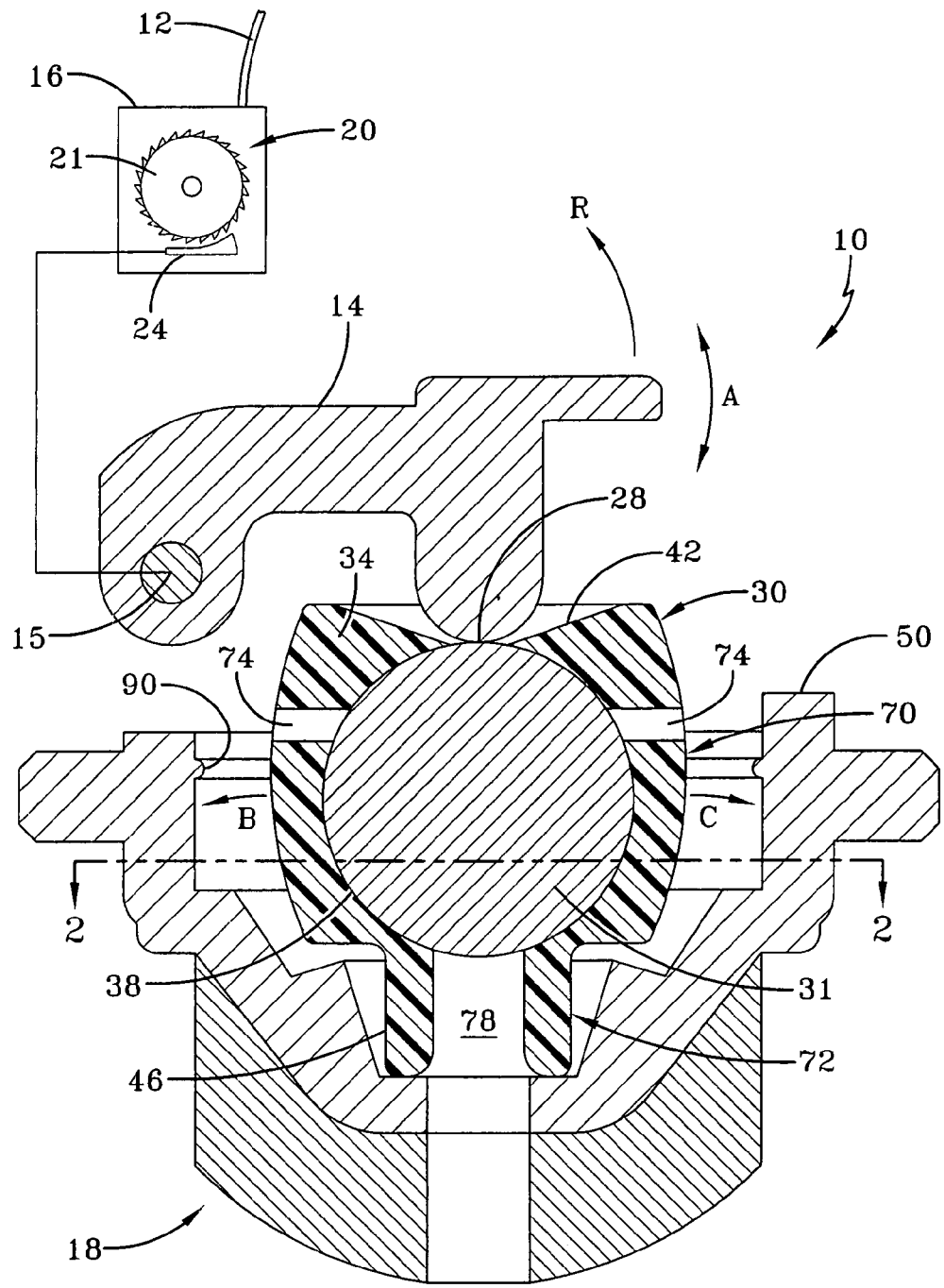
FIG. 1 is a side cross-sectional view of the inventive seat belt retractor, including an inertial sensor with an inertial sensor mass according to a first embodiment of the invention.

FIG. 1 is a side cross-sectional view of a seat belt retractor 10. Like conventional seat belt retractors, the inventive seat belt retractor 10 has retractor frame 16, which is used to house a seat belt webbing 12. In addition, the seat belt retractor 10 has a lock 20 assembled with the retractor frame, which comprises a locking wheel 21 with teeth that are selectively engageable with a locking pawl 24. The locking wheel 21 is rotatable with a coaxial spool upon which seat belt webbing 12 is wound and allows the seat belt webbing 12 to protract when unlocked from the locking pawl 24 and limits protraction when locked with the locking pawl 24. The locking pawl 24 is controlled by an actuator 14, here an arm, which moves the locking pawl 24 into an unlocked position or a locked position depending upon movement from an inertial sensor 18. While the locking pawl 24 is shown schematically separate from the actuator 14, they may form a single piece.

The inertial sensor 18 has an inertial sensor mass 30 that responds to changes in vehicle acceleration by moving in the direction of either arrow B or arrow C. In response to movement in either direction, the actuator 14 is pivotally mounted at a pivot 15 so as to move along an arc A in the direction of arrow R. At a certain point, pivotal movement of the actuator 14 in this direction triggers the locking pawl 24 to engage the locking wheel 21 of the seat belt retractor 10 as known. Otherwise, the locking pawl 24 is disengaged from the locking wheel 21, although seat belt retractor 16 may be provided with other sensors and locks, such as a web sensor and lock that may prevent seat belt webbing protraction. These features of the invention are known.

In contrast to conventional designs, the inertial sensor 18 has an inertial sensor mass 30 embedded in an elastomeric material 34. As shown, the elastomeric material 34 substantially surrounds and, in fact, encases the inertial sensor mass 30. Because the inertial sensor mass 30 is substantially surrounded by elastomeric material 34, any rattling noise arising from movement of the inertial sensor mass 30 within the housing 50 is greatly reduced. As shown, the elastomeric material 34 at least nearly surrounds the exterior surface 38 of the inertial sensor mass 30. The inertial sensor mass 30 has a greater density than the elastomeric material 34 to ensure that the inertial sensor mass 30 responds sufficiently to changes in vehicle acceleration. The inertial sensor mass 30 is preferably made of metal due to its high density.

The inertial sensor 18 has a first portion 42 and a second portion 46. The first portion 42 interacts with the actuator 14 to trigger the locking pawl 24. The second portion 46 supports the inertial sensor mass 30 on a housing 50. The inertial sensor 18 also has a wide portion 70 and a narrow portion 72. In this way, the wide portion 70 of the inertial sensor mass 30 may be suspended over the narrow portion 72 to allow the inertial sensor mass 30 to tip in the direction of either arrow B or arrow C depending upon changes in the acceleration of a vehicle. Although the inertial sensor 18 is shown having a particular shape, other shapes, such as a cylinder or ball shape, may incorporate the inventive features of the invention. The particular version shown in the drawings is not intended to be limiting.

Figure 2:
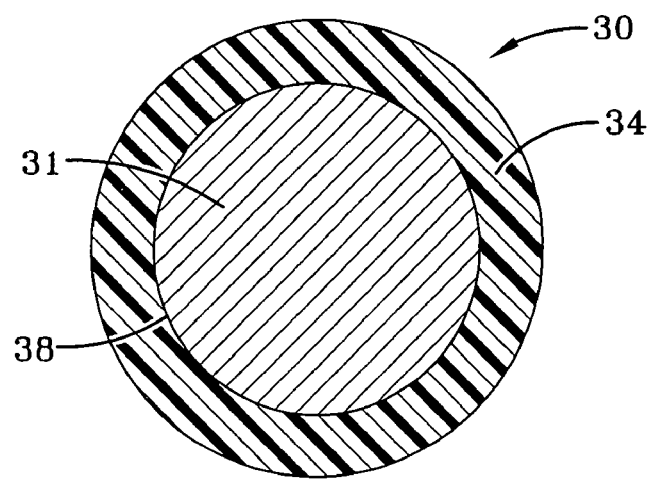
FIG. 2 is an overhead cross-sectional view of the inventive inertial sensor mass taken along line 2-2 of FIG. 1.

As shown in FIG. 1, the inertial sensor 18 has two cavities 74, 78 therein. As explained below, the cavities 74, 78 arise from the manufacturing of an inertial sensor mass. FIG. 2 is an overhead cross-sectional view of the inertial sensor 18. As shown in this cross-section, the body 31 of the inertial sensor mass 30 is almost completely surrounded by elastomeric material 34 having a hard top surface 28 exposed at the contact point with the actuator arm at the zero acceleration or vertical position while being completely covered around its sides. This additional elastomeric material 34 limits noise production from these areas.

Figure 3:
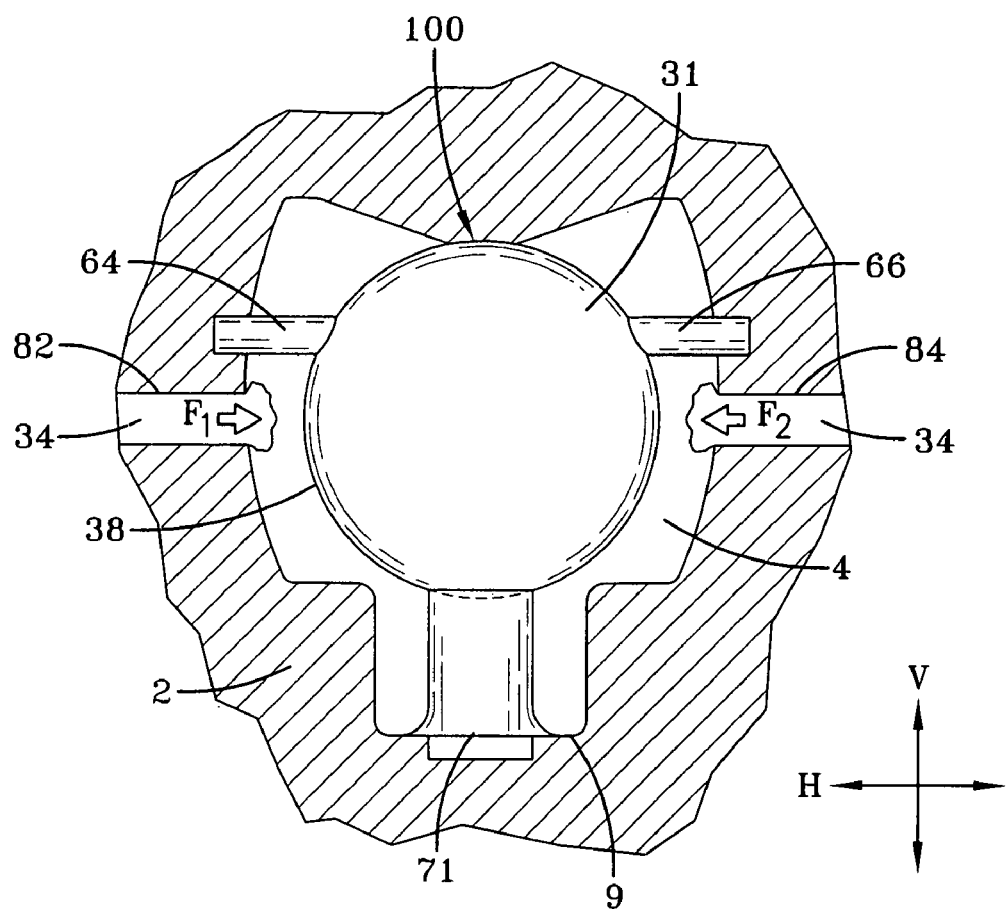
FIG. 3 illustrates an inventive technique for manufacturing the inertial sensor mass of FIGS. 1 and 2.

The inventive technique for manufacturing the inventive seat belt retractor 10 will now be explained with reference to FIG. 3. As shown, there is provided a mold 2 having a cavity 4. The cavity 4 is sized larger than the inertial sensor mass 30. In addition, the cavity 4 has the shape of the inertial sensor 18 shown in FIGS. 1 and 2. Other shapes and forms may be used to accommodate any particular application or fit any particular sensor housing. The body 31 of the inertial sensor mass 30 is suspended over the bottom 9 of the cavity 4 by a vertically oriented base pin 71 and a first horizontally oriented pin 64 and a second horizontally oriented pin 66. The first horizontally oriented pin 64 and second horizontally oriented pin 66 secure the body 31 of the inertial sensor mass 30 in a horizontal direction along an axis H while the vertically oriented base pin 71 supports the inertial sensor mass 30 in a vertical direction along an axis V. Moreover, a portion 100 of the mold cavity 4 is arcuately shaped to accommodate the spherical shape of the inertial sensor mass 30. Likewise, the pins 64, 66 and 71 have cone shaped depressions to accommodate the spherical shape of the inertial sensor mass 30. In this way, the inertial body 31 may be supported by the pins 64, 66 and 71 to ensure its proper location within the cavity 4. Also, the absence of elastomeric material 34 at location 100 reduces friction between the actuator 14 and the inertial sensor 18 to improve responsiveness. The vertically oriented base pin 71 may be magnetic so as to attract the body 31 of the inertial sensor mass 30, here a ferromagnetic sphere. In this way, the body 31 may be secured to the vertically oriented base pin 71. The pins 64, 66 and 71 serve the important function of preventing the body 31 of the inertial sensor mass 30 from shifting during the molding process. During the molding process, the body 31 may move within the cavity 4 even as supported. However, because the body 31 has a greater density than the elastomeric material 34, the body 31 of the inertial sensor mass 30 will eventually settle onto the vertically oriented base pin 71 during the forming process.

To further prevent the body 31 of the inertial sensor mass 30 from moving within the cavity 4, the mold 2 is provided with two gates 82, 84. One gate 82 injects the elastomeric material 34 in the direction indicated by arrow $F_1$ while the other gate 84 injects the elastomeric material 34 in the direction indicated by arrow $F_2$. The direction indicated by arrow $F_1$ is generally opposite to the direction indicated by arrow $F_2$. In so doing, the force from the elastomeric material in the direction indicated by arrow $F_1$ tends to cancel the force of the elastomeric material from the direction indicated by arrow $F_2$, thereby resulting in a net force on the inertial sensor mass 30 that is insubstantial so that the body 31 of the inertial sensor mass 30 will stay in place horizontally. Following the injection process, the elastomeric material 34 is allowed to form and dry. The mold 2 is then opened and the pins 64, 66 and 71 are withdrawn.

The body 31 of the inertial sensor mass 30 may be made from steel, iron, brass, tungsten, copper, or other dense materials having a density greater than the density of the elastomeric material 34. It is preferable that the body 31 of the inertial sensor mass 30 is made from a ferromagnetic material so that it may be held in place by a magnetic vertically oriented base pin 70. The elastomeric material 34 may be polypropylene, HYTREL® from DuPont™, or other polymers chosen for their low noise production characteristics. In addition, tungsten or barium sulfate particles may be mixed with the elastomeric material 34 to add mass. Because the inertial sensor 18 is molded, ribbing and other noise control shapes may be easily added by changing the shape of the mold cavity 4. Such ribbing and optional noise control features are described in the description of the following embodiments.

Figure 4:
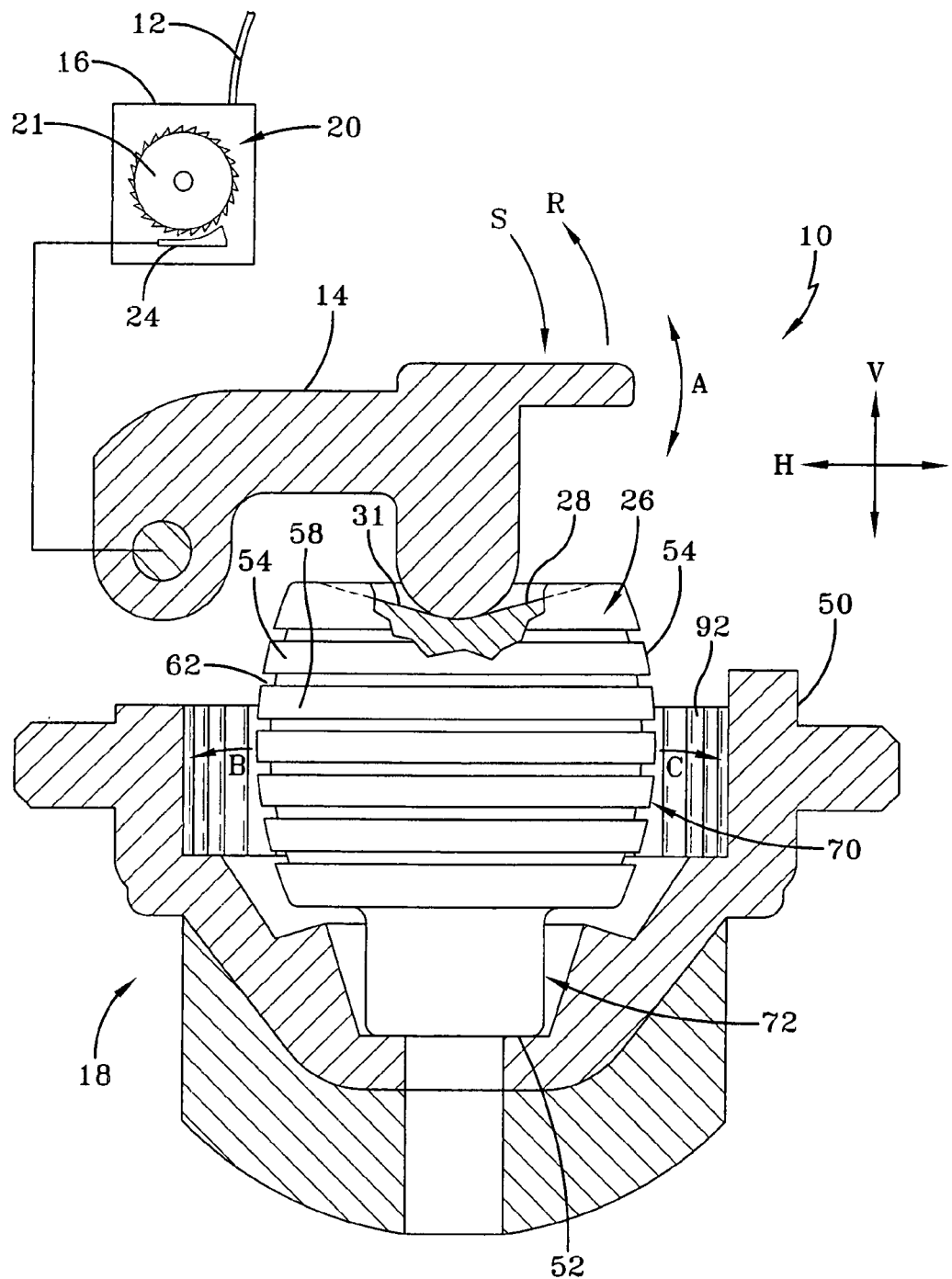
FIG. 4 is a side view, partially in section, of a seat belt retractor assembly 10 according to a second embodiment of the invention.

FIG. 4 is a side view, partially in section, of a seatbelt retractor assembly 10 according to a second embodiment of the present invention. Like conventional seatbelt retractors, the seatbelt retractor of the present invention has a seatbelt 12, which is retractable within a seatbelt retractor 10. The seatbelt retractor 10 has a lock 20 which includes an actuator locking pawl 24, which serves to lock and unlock the seatbelt retractor and thereby prevent or allow the seatbelt 12 to extend from a retractor housing frame 16. In addition, the actuator locking pawl 24 is mechanically linked to an actuator arm 14, which serves as a trigger for the actuator locking pawl 24. While the actuator 24 is shown schematically separate from the actuator arm 14, they may form a single piece.

The actuator arm 14 is pivotable along an arc A. Furthermore, the actuator arm 14 is in contact with an inertial sensor 18 via the top 28 of an inertial sensor mass 26. Inertial sensor mass 26 rests on floor 52 of housing 50. As known, when the inertial sensor mass 26 experiences in excess of a predetermined amount of deceleration, the inertial sensor mass 26 may tip in the direction of arrow B or C so as to move the actuator arm 14 in the direction of arrow R along the arc A and thereby actuate the actuator locking pawl 24 to lock the seatbelt retractor 10. Movement in the opposite direction along arrow S unlocks the seatbelt retractor 10 when the inertial sensor mass 26 returns to its original position. These features of the seatbelt retractor assembly 10 are known.

Figure 5:
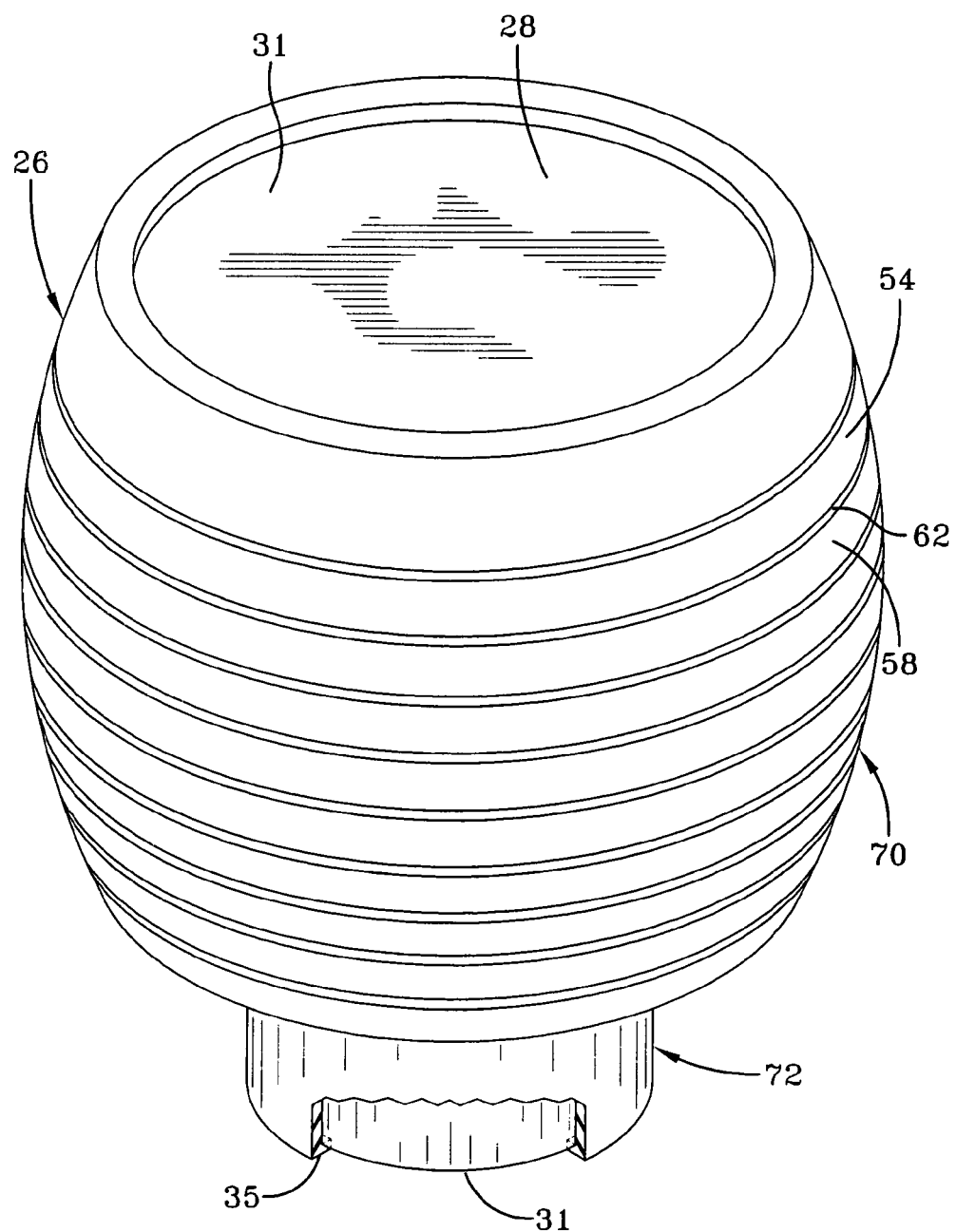
FIG. 5 is an upper perspective view of the inertial sensor mass from FIG. 4.

In contrast to conventional designs, the inertial sensor mass 26 has segmented portions that permit the absorption of vibration. As shown in FIGS. 4 and 5, the inertial sensor mass 26 has at least one, preferably one or more first members 54 that extend circumferentially around the inertial sensor mass 26 in a generally horizontal direction H. As used herein and in the claims a horizontal direction is understood to refer to a direction perpendicular to a vertical direction V wherein vertical is a direction parallel to the longitudinal axis of the inertial mass when the inertial mass is not being subjected to any acceleration or deceleration. In addition, spaced from the first member 54 by a gap 62 is at least one, preferably one or more second protruding members 58, which also extends in a generally horizontal direction around the inertial sensor mass 26. Both the first protruding member 54 and second member 58 protrude above a surface of the body 31 of the inertial mass. Accordingly, in the event that the inertial mass vibrates, the body 31 of the inertial mass will vibrate at a different frequency than the first protruding member 54 or second protruding member 58. As shown the inertial sensor mass 26 has a plurality of first and second protruding members 54, 56 spaced by gaps 62. Consequently, sound from the inertial sensor mass 26 will be damped by the independently moving first member 54 and second member 58.

To further reduce noise and facilitate the manufacture of the first member 54 and second member 58, the inertial sensor mass 26 is preferably made from an elastomeric material 34 with a metal body 31 embedded therein as described in the first embodiment. The metal body 31 provides the appropriate weight to the inertial sensor mass 26 while the elastomeric material 34 serves to cushion vibration and soften contact points. An elastomer with a high density but having sufficient resilience should be used. The elastomer may be ECO-MASS™ made by PolyOne, Inc. or THERMOCOMP HSG™ made by LNP Engineering Plastics, Inc. The inertial sensor mass 26 may be cast or molded to create members 54, 58 or alternatively these members can be formed by a cutting operation.

As shown in FIG. 4, the inertial sensor mass 26 has a wide portion 70 and narrow portion 72. The wide portion 70 has a larger circumference than the narrow portion 72. The first and second members 54, 58 are shown located on the wide portion 70 but may also be located on the narrow portion 72.

Figure 6:
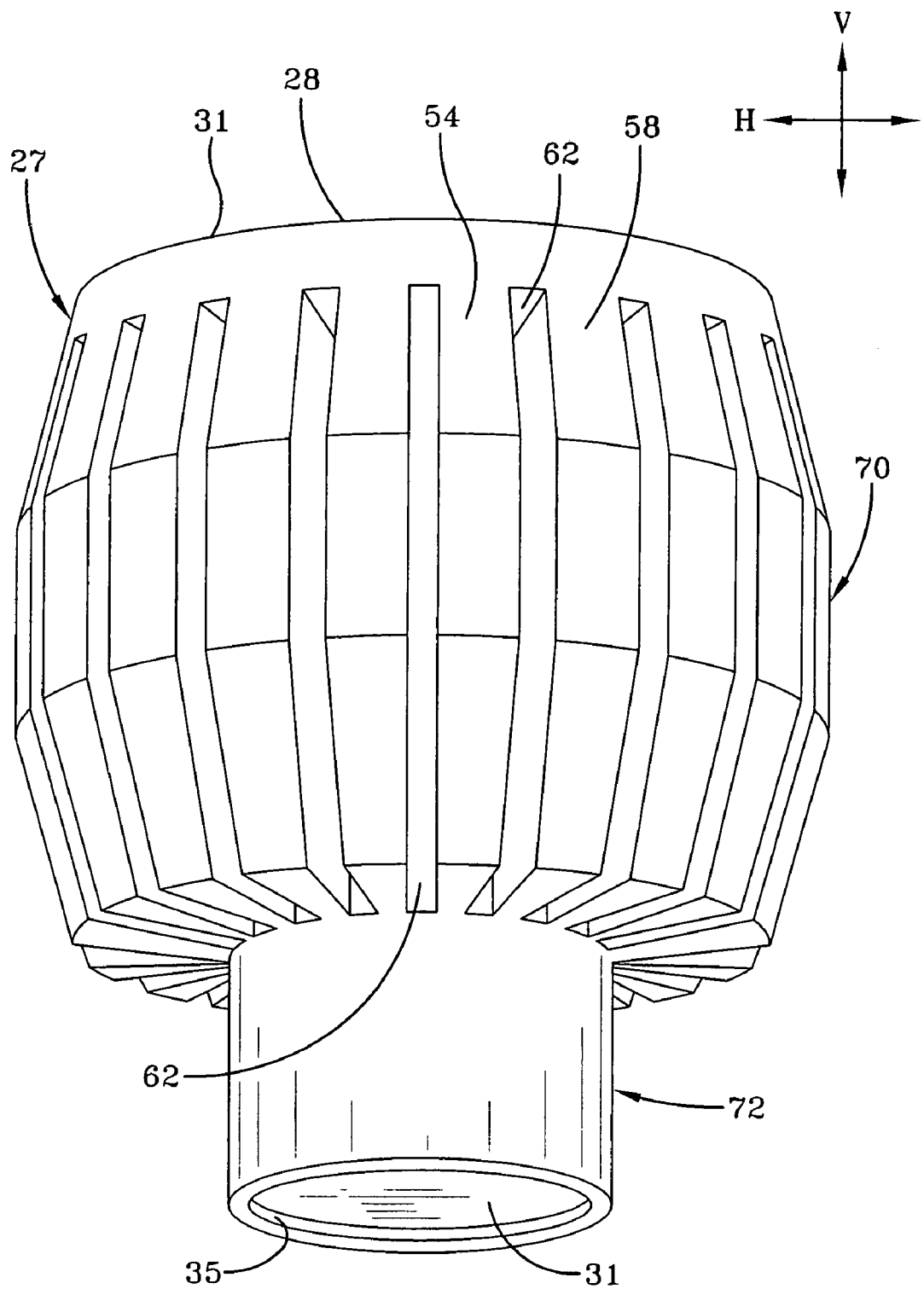
FIG. 6 is a lower perspective view of a third embodiment inertial sensor mass according to the invention.

FIG. 6 illustrates another version of the inventive inertial sensor mass 26. Here, at least one, preferably one or more first members 54 and at least one, preferably one or more second members 58 are spaced from each other by gaps 62 like the previous design. The one or more first members 54 and one or more second members 58 further protrude generally perpendicularly from the body 31 of the inertial sensor mass. The inertial sensor mass 27 also has a wide portion 70 and a narrow portion 72. Unlike the previous design, however, the inertial sensor mass 27 has the first member 54 and second member 58 extending in a generally vertical direction parallel to the vertical axis V of the inertial sensor mass. As shown this embodiment has a plurality of first and second protruding members spaced by gaps 62. In each embodiment the gaps 62 provide a space for a protruding member to move or deflect on contact with the housing thus enhancing the energy absorbing ability of the elastomer to reduce the noise generated by the impact of the inertial sensor. This deflection or movement creates a phenomena of a spring or cushioning blow to deaden the noise. As referred herein this phenomena is referred to as "soft contact". The ability of each rib-like protruding member 54 or 58 to move independently into the void area created by the gap 62 further enhances the noise reducing qualities of the inertia sensor mass 26 embedded in the elastomeric material.

Figure 7:
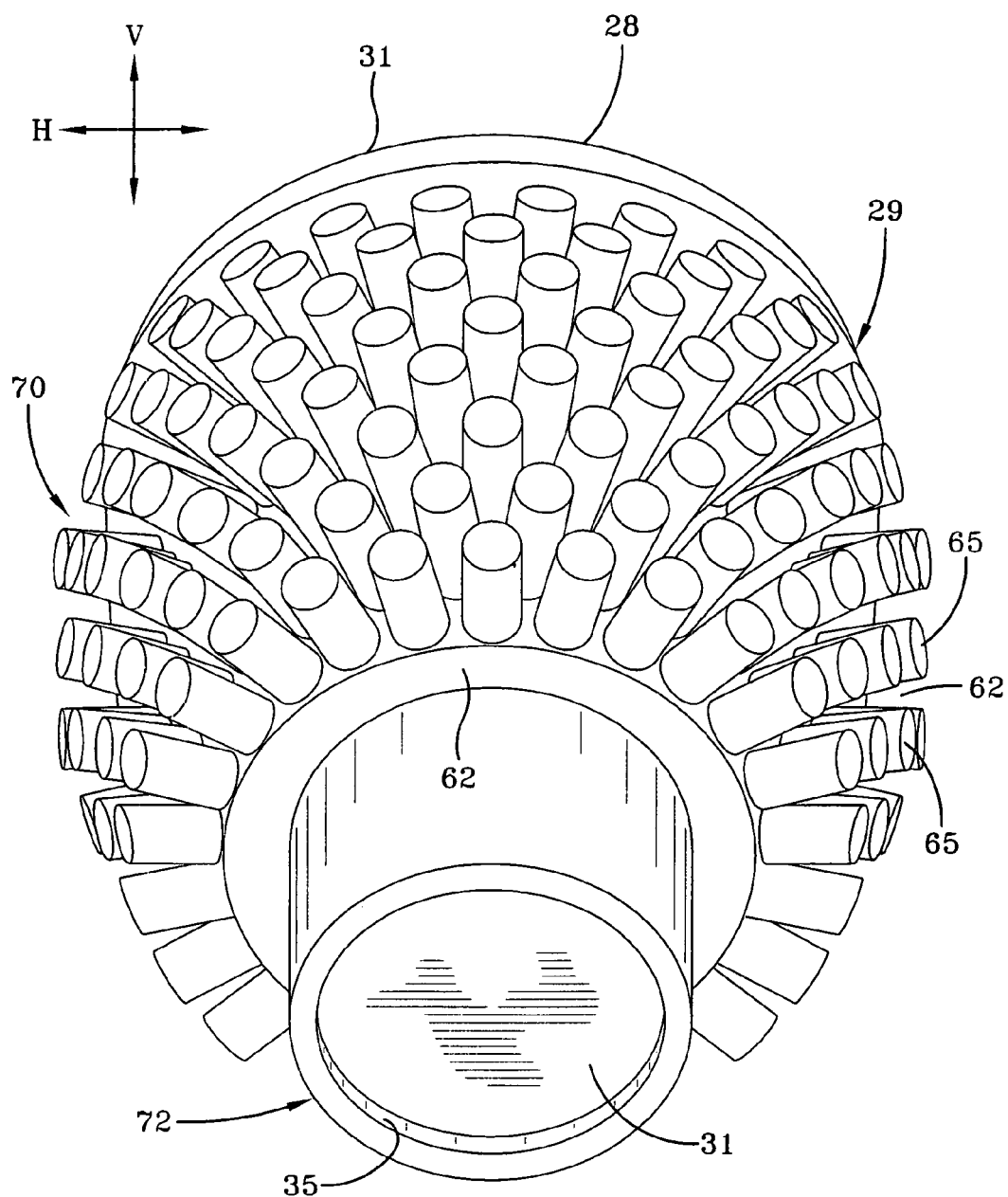
FIG. 7 is a lower perspective view of a fourth embodiment of the invention.

FIG. 7, according to a fourth embodiment is a perspective view looking upwards of an inertial sensor mass 29. Like the previous designs, the inertial sensor mass 29 has a narrow portion 70 and a wide portion 72. Unlike the other designs, however, extending from body 31 of the inertial sensor are bristles 65 that extend outwardly from around the body 31 and are generally perpendicular to the surface of the body 31 of the inertial sensor mass 29 as shown in FIG. 7. In this design the individual bristles 65 are surrounded by gaps 62 and protrude outwardly from the inertial sensor mass in a design pattern that insures a first contact of a bristle 65 with the housing. The bristles being spaced and independently movable act like soft springs to deaden the impact or contact noise. The number of bristles contacting the housing depends on the stiffness of the bristles and the rate of acceleration or deceleration.

Figure 8:
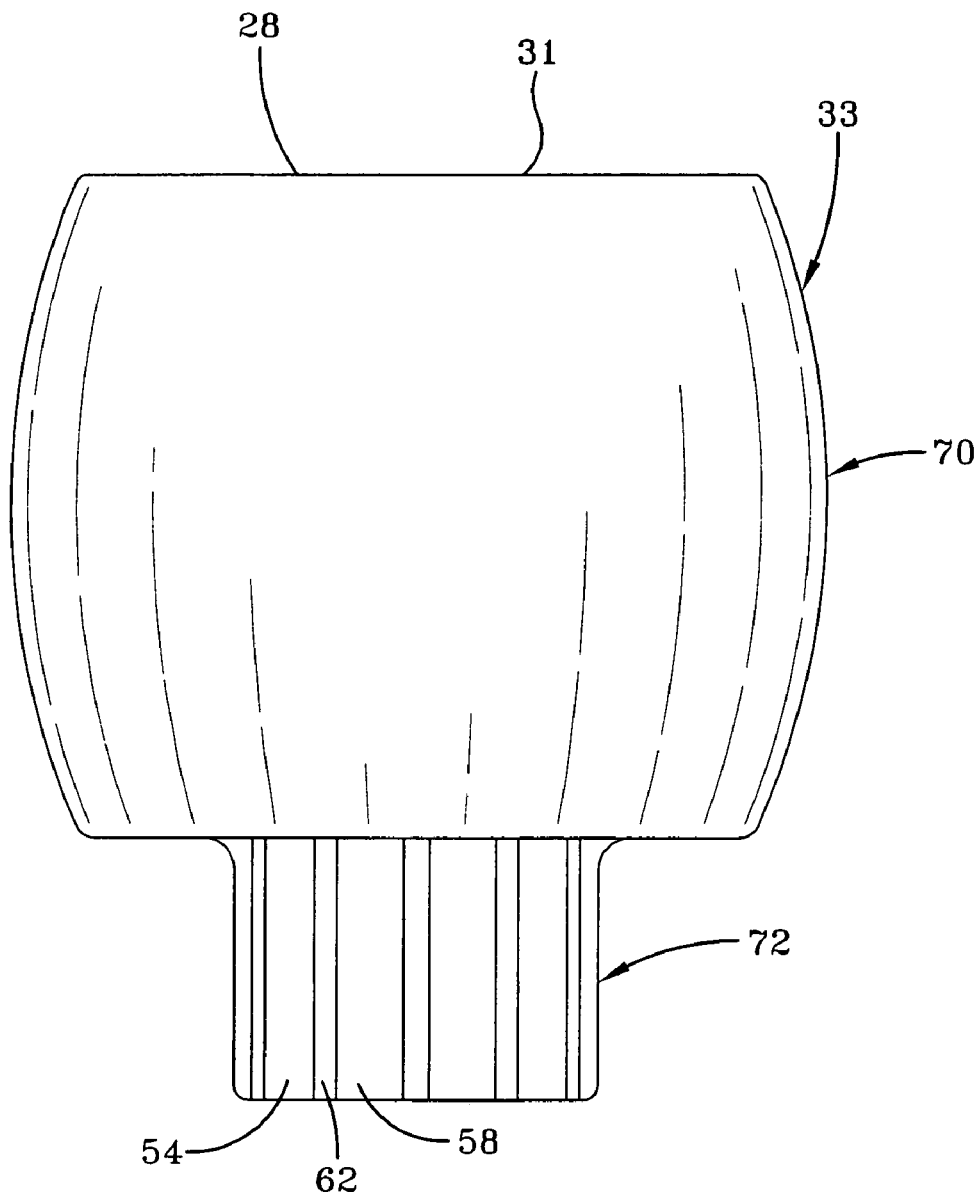
FIG. 8 is a side view of a fifth embodiment of the invention.

FIG. 8 illustrates a fifth version of the inventive inertial sensor mass. An inertial sensor mass 33 has a wide portion 70 and a narrow portion 72. At least one, preferably one or more first protruding members 54 are also spaced from at least one, preferably one or more second protruding members 58 by gaps 62. However, in contrast to the other designs, the first protruding member 54 and second protruding member 58 are located on the narrow portion 72 of the inertial sensor mass. This embodiment serves to damp noise at narrow portion 72. This feature may be used separately or in combination with any of the aforementioned embodiments.

Figure 9:
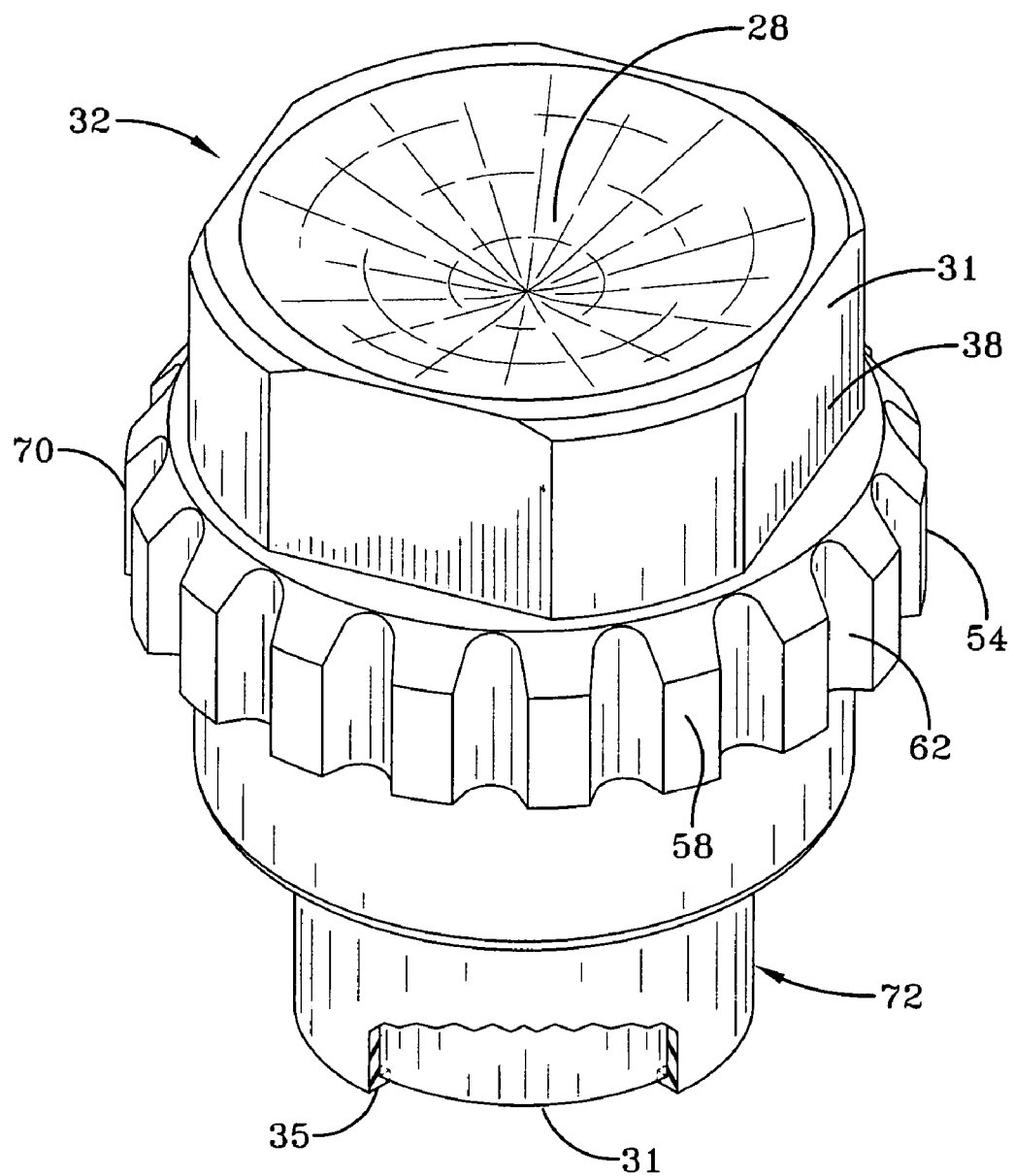
FIG. 9 is a lower perspective view of a sixth embodiment according to the present invention.
Figure 10:
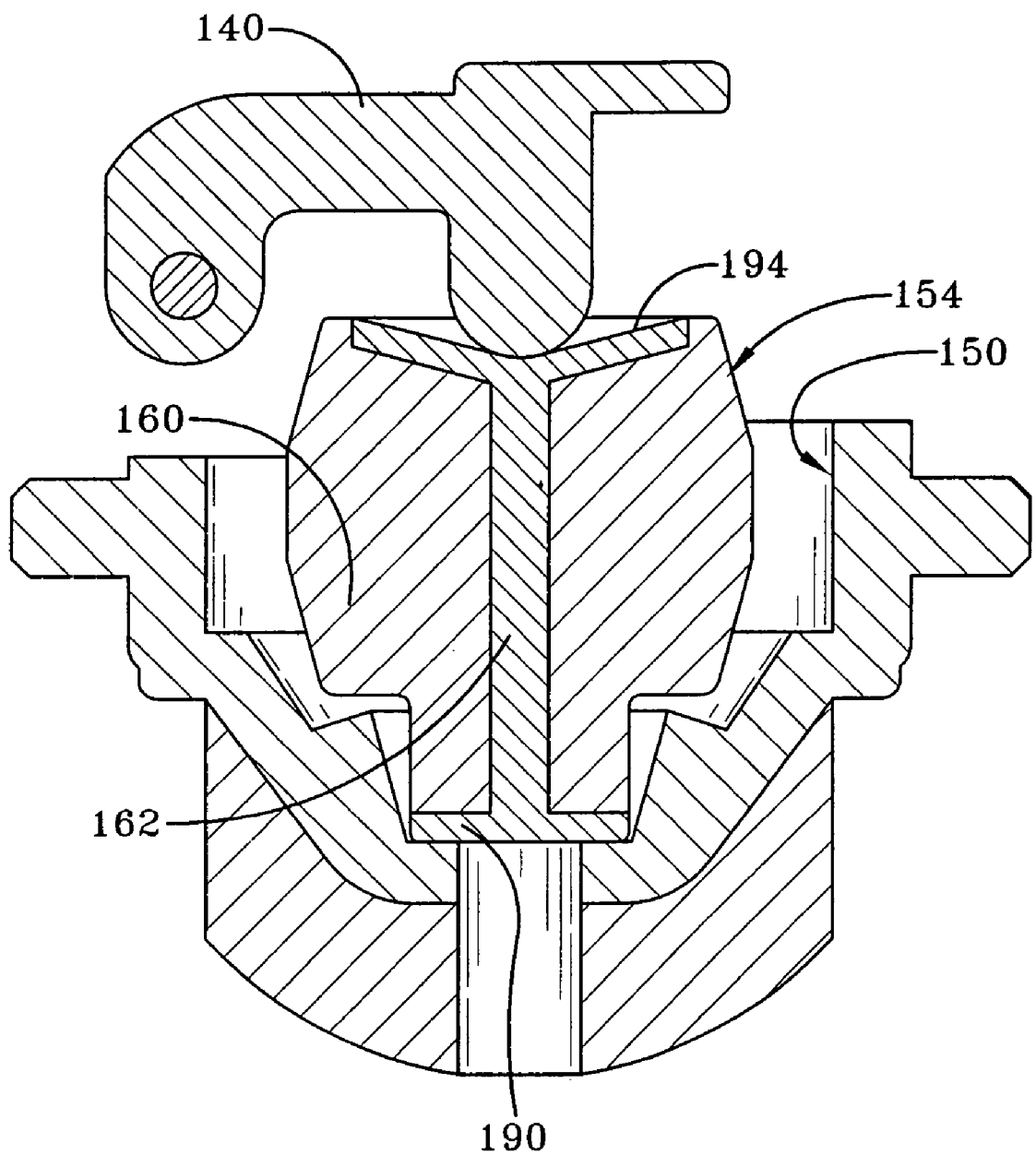
FIG. 10 is a cross sectional view of a prior art inertial sensor mass according to U.S. Pat. No. 6,164,581.

With reference to FIG. 9 a sixth embodiment of the present invention is shown. In this embodiment the inertial sensor mass 32 has the upper circumferential surfaces of the mass body 31 exposed and the elastomeric material 34 surrounds a middle region of the wide portion 70 of the mass body 31 and extends toward the lower narrow end 72. Along the outer surface of the elastomer 34 one or more vertically extending protruding members 54, 58 protrude a distance sufficient to insure the elastomer 34 contacts the housing 50 at one or more members 54, 58. This design as in the other designs has an upper hard surface 28. As shown the surface 28 is a somewhat conical depression typically inclined at about 15 degrees. As surface 28 tilts the actuator lever arm 14 is lifted. The hard surface 28 of the body 31 being free of the elastomeric material 34 provides the desired low coefficient of friction.

At the narrow lower end the elastomer wraps around the circumferential edge to provide a soft contact lip 35 for the sensor 32. Preferably each of the embodiments shown has the soft contact lip 35 or the elastomeric narrow portion 46 of the first embodiment shown in FIG. 1.

As in the first embodiment the elastomer 34 can be molded around the peripheral surfaces 38 of the inertial mass 32. The lower narrow end 72 provides an end base which can be sealed off in a mold 2. Similarly the exposed upper portion 70 of the body 31 can be placed in a recess in a mold thereby centering the mass body 31 prior to injecting the elastomer 34. In this fashion the molding of the inertial mass sensor 32 is simplified over the sensor 18 of the first embodiment shown in FIGS. 1 through 3.

An added optional noise reducing feature can be added to the housing 50 as shown in FIG. 1. In FIG. 1 an annular protrusion or bumper 90 is shown. Alternatively optional vertical bumper ridges 92 may be molded into the plastic housing 50 as shown in FIG. 4. The advantage of employing protruding bumper ridges or bumpers 90, 92 on the housing 50 that are complimentary to the members 54, 58 of the elastomer 34 is the contact point becomes very localized in an area defined by the contacting member 54, 58 on the sensor mass 26, 27, 29, 32 or 33 or the smooth elastomeric outer surface of the sensor 18 of the first embodiment and the impacted protruding bumper ridges or bumpers 90, 92. This insures the energy is absorbed by a more exaggerated or pronounced movement or deflection of the contact members 54 or 58 relative to the mass body 31. This enhances the sound absorbing potential of the assembly.

Acoustical testing of the noise generation of the present invention inertial sensor mass 32 according to the embodiment shown in FIG. 9 has demonstrated significant reductions in vibratory noise or rattle noise without sacrificing the beneficial low friction characteristics of the hard surface of an all metal mass. The present invention dramatically reduced the rattle noise without appreciably affecting the cost of these tilt type sensors.

As shown and described the center mass preferably is a mass heavy material such as a metal having specific gravity 2 to 11. Steel, tungsten, copper, or barium sulfate by way of example are suitable materials. The elastomer can be a rubber, polyurethane or nylon material by way of example. The elastomer can be a thermoset or thermoplastic material. Typically these inertial sensor masses are very small, have a weight in the range of 1 to 12 grams. Ideally the total mass is relatively low while the mass density is high to insure good sensitivity to acceleration changes. Accordingly the elastomer 34 can be mixed with a filler having a mass heavier than the elastomer to increase the tilt weight sensitivity.

As described above each of the alternative embodiments of the sensor 18 has the contact location between the actuator lever 14 and the sensor mass, 26, 27, 29, 32 and 33 at the surface 28 made of a hard low friction material to insure the sensitivity of the mass sensor is not adversely affected by the elastomeric material. It is considered feasible that the elastomeric material may be selected from a broader range of materials in addition to rubber or rubber-like materials such as urethane, and maybe a thermoplastic that is injection molded such as polyethylene or polypropylene. If such plastics are used the members 54, 58 must be made sufficiently flexible to move relative the body 31 to absorb the vibrational energy to soften the contacts thus lowering the rattle noises. In such a case the increased mass provided by the metal body may be alternatively provided by a heavy filler like metal fibers or powders dispersed through the elastomer 34 to provide a combination of a low friction upper surface with flexible or movable members 54, 58. This is most easily understood from the bristle embodiment of FIG. 7. In this case the metal body 31 and the elastomer 34 can be combined by simply forming a filled elastomeric sensor without an embedded metal body, but a dispersion of filler material of suitable density.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An inertial sensor mass for use in a seatbelt retractor assembly, said inertial sensor mass comprising a solid body having a wide portion and a narrow portion, a middle region of the wide portion of the solid body being embedded in an elastomeric material that extends to a lower end of the inertial sensor mass, the solid body comprising a material having a density that is greater than the density of the elastomeric material, the elastomeric material forming an elastomeric flange around the middle region of the wide portion of the solid body, said elastomeric flange having protruding generally vertically extending elastomeric members extending from the elastomeric flange, said protruding elastomeric members are separated by gaps and are movable relative to said solid body, an upper region of the wide portion of the solid body comprises a portion of an exterior surface of the solid body that is free of the elastomeric material for contacting a component of a seatbelt retractor assembly.

2. The inertial sensor mass of claim 1 wherein said solid body comprises a metal.

3. The inertial sensor mass of claim 1 wherein said solid body comprises a ferromagnetic material.

4. The inertial sensor mass of claim 1 wherein said elastomeric material comprises a polypropylene.

5. The inertial sensor mass of claim 2 wherein said elastomeric material comprises a polypropylene.

6. The inertial sensor mass of claim 3 wherein said elastomeric material comprises a polypropylene.

\* \* \* \* \*